(12) United States Patent
Murakami et al.

(10) Patent No.: US 7,525,585 B2
(45) Date of Patent: Apr. 28, 2009

(54) SOLID-STATE IMAGE PICKUP DEVICE AND IMAGE PICKUP METHOD

(75) Inventors: Masashi Murakami, Kyoto (JP); Masayuki Masuyama, Nagaokakyo (JP); Yoshiyuki Matsunaga, Kamakura (JP)

(73) Assignee: Panasonic Corporation, Osaka (JP)

( * ) Notice: Subject to any disclaimer, the term of this patent is extended or adjusted under 35 U.S.C. 154(b) by 631 days.

(21) Appl. No.: 10/545,953

(22) PCT Filed: Apr. 5, 2004

(86) PCT No.: PCT/JP2004/004893

§ 371 (c)(1),
(2), (4) Date: Aug. 17, 2005

(87) PCT Pub. No.: WO2004/091196

PCT Pub. Date: Oct. 21, 2004

(65) Prior Publication Data

US 2006/0158540 A1     Jul. 20, 2006

(30) Foreign Application Priority Data

Apr. 8, 2003     (JP) ............................. 2003-104547

(51) Int. Cl.
*H04N 5/335*     (2006.01)
*H01L 27/00*     (2006.01)

(52) U.S. Cl. .................................... 348/294; 250/208.1

(58) Field of Classification Search ................ 348/308, 348/241, 302, 304; 257/291–292; 250/208.1
See application file for complete search history.

(56) References Cited

U.S. PATENT DOCUMENTS 5,744,807 A     4/1998     Weisfield (Continued)

FOREIGN PATENT DOCUMENTS

EP     0 814 606 A2     12/1997

(Continued)

OTHER PUBLICATIONS

Supplementary European Search Report issued in corresponding European Patent Application No. EP 04 72 5800, dated Dec. 4, 2006.

*Primary Examiner*—Nhan T Tran
*Assistant Examiner*—Mekonnen Dagnew
(74) *Attorney, Agent, or Firm*—McDermott Will & Emery LLP

(57) ABSTRACT

A solid-state image pickup device consists of a plurality of pixels arranged in a matrix for outputting an image signal corresponding to the received light intensity. The solid-state image pickup device includes: reset switches (13,23) for opening/closing between a VDDCELL that repeatedly and cyclically outputs a high potential and a low potential and an electric charge holding section in each pixel; reset signal lines (97,98) connected to pixels of the same row; a row scan circuit (80) for successively selecting rows, always giving Hi impedance or Lo impedance to the reset signal of the selected row and Hi impedance to the reset signal lines of the non-selected row; and an ALLRS circuit 94 for giving the Lo potential to the reset line of the non-selected row before and after the rise of VDCELL from a low potential to high potential. Thus, the solid-state image pickup device can reduce its size and increase its operation speed while suppressing lowering of the dynamic range.

9 Claims, 9 Drawing Sheets

U.S. PATENT DOCUMENTS

| | | | |
|---|---|---|---|
| 6,798,451 B1 * | 9/2004 | Suzuki et al. | 348/294 |
| 2001/0030701 A1 * | 10/2001 | Hiyama et al. | 348/304 |
| 2002/0032545 A1 * | 3/2002 | Mabuchi | 702/189 |
| 2003/0146993 A1 | 8/2003 | Kokubun et al. | |

FOREIGN PATENT DOCUMENTS

| | | |
|---|---|---|
| JP | 2000-92392 A | 3/2000 |
| JP | 2003-46846 A | 2/2003 |
| JP | 2003-46864 | 2/2003 |
| JP | 2003-46879 A | 2/2003 |
| JP | 2003-234959 A | 8/2003 |

* cited by examiner

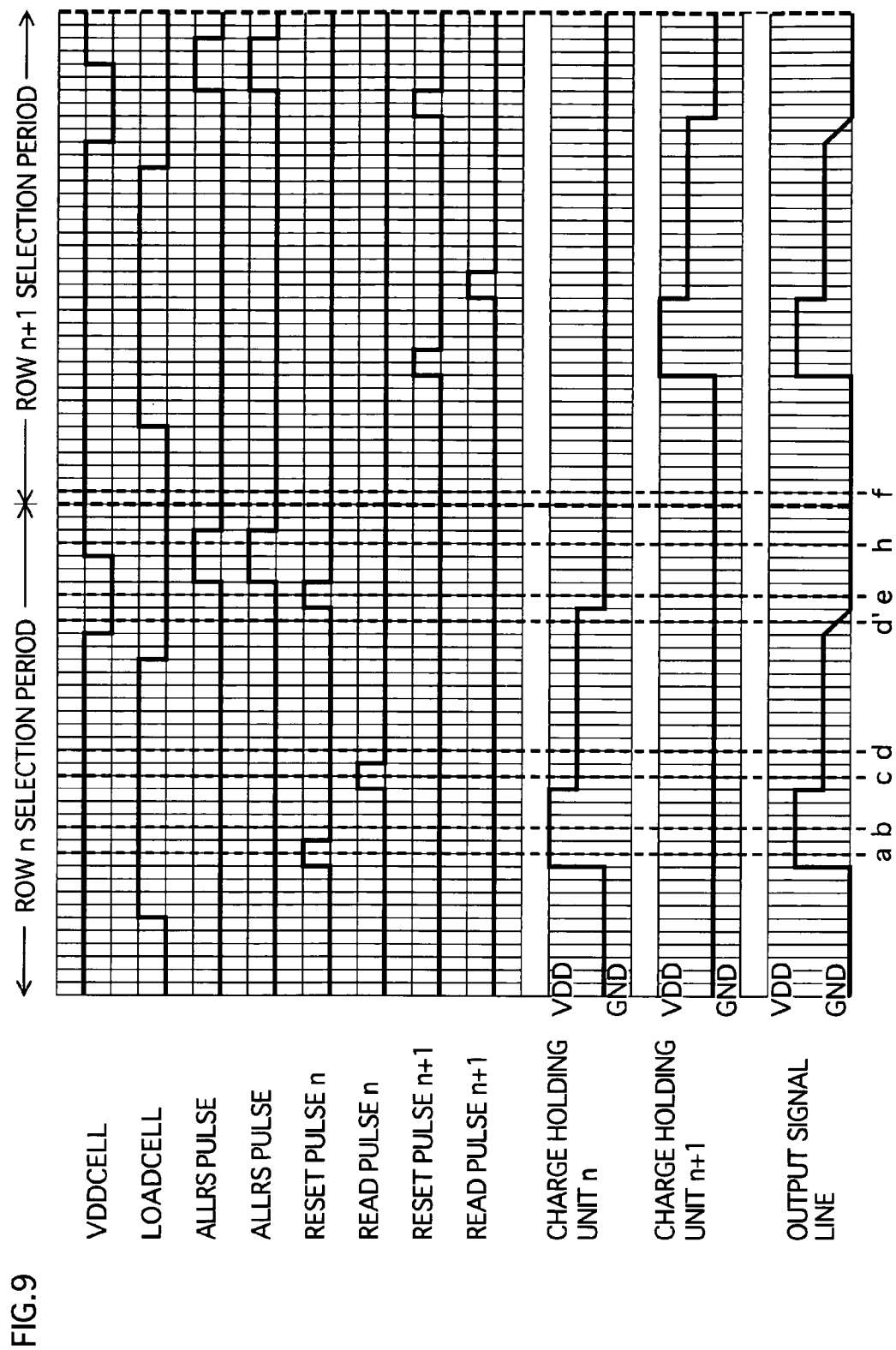

SOLID-STATE IMAGE PICKUP DEVICE AND IMAGE PICKUP METHOD

RELATED APPLICATION

This application is a U.S. national phase application of PCT international application PCT/JP2004/004893, filed on Apr. 5, 2004, which in turn claims the benefit of Japanese Application No. 2003-104547, filed on Apr. 8, 2003, the disclosure of which Applications are incorporated by reference herein.

TECHNICAL FIELD

The present invention relates to a solid-state image pickup device and image pickup method, and especially relates to a technique for suppressing lowering of the dynamic range of the solid-state image pickup device.

BACKGROUND ART

MOS type elements have been widely used in solid-state image pickup devices for some time. Within a solid-state image pickup device, a plurality of pixels that generate a signal potential based on a received light intensity are provided, the plurality of pixels making use of common output lines to transmit the signal potentials to a signal processing section. In order to make use of time division on the output line in this kind of imaging device in which a plurality of pixels have a common output line, a pixel selection function is required such that only a specified pixel outputs a signal potential, and pixels other than the specified pixel do not output a signal potential. Scanning circuits to make the plurality of pixels operate sequentially, one at a time, is also required.

The above selection function problem maybe solved by providing a switch transistor at the output terminal of each pixel, but in this case all the pixels have to be provided with a switch transistor, and the requirement for an image pickup device of reduced size cannot be met. A technique to overcome this is disclosed in Japanese laid-open patent application publication number 2003-46864. In this technique the source potential supplied in common to every pixel is not fixed, but is made to vary cyclically between a high potential and a low potential. By doing this, the specified cell is made to output a signal potential exclusively without switch transistors being provided for each pixel.

Also, a scanning circuit constructed from dynamic logic is disclosed in Japanese laid open patent application publication number 2003-46879. In particular, the fact that the scanning circuit can be made to operate faster by using dynamic logic with NMOS transistors is disclosed.

However, the above solid-state image pickup device with both a scanning circuit constructed using dynamic logic and a source circuit in which in which the potential varies cyclically has the following problem.

In a scanning circuit constructed using dynamic logic, when a selected pixel outputs a signal, the potential at the output terminal goes to either one of a Hi potential or a Lo potential, the output terminals for the unselected pixels go to a high impedance, and the signal lines which tie the unselected pixels to the high impedance output terminals go into a floating state.

If the signal line goes into a floating state, the repeated transitions of the power source potential between a high potential and a low potential have an effect due to the coupling capacitance inherent in the structure of integrated circuits. Specifically, when the source potential makes a transition from a low potential to a high potential, the potential on the signal line in a floating state rises, due to the effect of the coupling capacitance, and the potential on the signal line resembles a signal to put an unselected pixel in a selected state. Hence, the signal potential from an unselected pixel is outputted, the potential on the signal line is modulated, and the signal potential from the legitimately chosen pixel can no longer be accurately detected.

Note also that the signal processing section that detects the signal potential from a pixel reads off, as the pixel signal, the size of the drop in the signal potential from a reference potential initially outputted by the pixel, this drop depending on the light intensity received by the pixel. The higher the pixel signal, the lower the potential on the output line becomes. Thus the modulating effect on the output line due to the unselected pixels cannot be ignored. This effect is known as a lowering of the dynamic range.

DISCLOSURE OF THE INVENTION

The object of the present invention is to provide an solid-state image pickup device and image pickup method which suppress the lowering of the dynamic range while satisfying requirements including size reduction and increased operation speed.

The solid state image device of the present invention is a solid-state image pickup device in which a plurality of pixels are arranged in a matrix, each column of pixels in the matrix being connected to a corresponding output line, each pixel having a charge holding unit that holds an electric charge corresponding to a received light intensity, and when rendered effective, outputting a pixel signal based on a fluctuation of the electric charge held in the charge holding unit, the pixel signal being detected via the output line, the solid-state image pickup device including: a separate power source switch in each pixel, the power source switch opening and closing a connection between the charge holding unit in the pixel an output circuit which repeatedly outputs a cycle of high and low potentials; a plurality of row control signal lines, each connecting to pixels in a row, and controlling the opening and closing of the power source switches in the pixels in the row; a row scan circuit that (a) selects rows sequentially, (b) applies, to the row control signal line of a selected row, one of an opening potential for opening the power source switch and a closing potential for closing the power source switch, a pixel in the selected row being rendered effective by closing and then opening the power source switch when an output of the output circuit is at a high potential, and then rendered ineffective by closing and then opening the power source switch when the output of the output circuit is at a low potential, and (c) goes to a high impedance with respect to the row control signal lines of non-selected rows without applying either the opening potential or the closing potential; and a potential applying unit operable to apply the opening potential to the row control signal lines of non-selected rows for a period starting before and finishing after the rise of the output circuit output from a low potential to a high potential.

With the above construction, for a period starting before and finishing after the power source potential rises from a low potential to a high potential, the potential of the row control signal line of a non-selected row is at an opening potential that opens the power source switch. Hence, for this period at least, row control signal lines of non-selected rows are not in a floating state. Thus, the rise in potential of row control signal lines in a floating state that, due to the coupling capacitance, accompanies the rise of the power source voltage disappears, and a situation in which a signal is output despite pixels being from a non-selected row does not arise.

Therefore, it is possible to suppress the lowering of the dynamic range of the solid-state image pickup device.

Note also, when the row scan circuit is applying the opening potential to the row control signal line of the selected row, the potential applying unit may apply the opening potential to all the row control signal lines regardless of whether the rows are non-selected rows or selected rows.

The solid-state image pickup device selects one row via the scanning circuit, renders the pixels of the selected row effective and detects the pixel signals from the relevant pixels, and then, after rendering the same pixels ineffective, sequentially performs an operation to select the next row. In summary, the selected row varies with time and is not fixed. Accordingly, where the operation to put the potential of row control signal line at the opening potential is to be performed only on the row control signal lines of non-selected rows, a special function for choosing only the row control signal lines of non-selected rows is required.

However, with the above construction, even though the row control signal line of the selected row is not in a floating state to begin with, by putting all of the row control signal lines to a common opening potential, the requirement for the special function is eliminated.

Note also, the solid-state image pickup device may further include: a plurality of GND switches, each of which opens and closes a connection between a GND unit that applies the opening potential and the row control signal line for each row; and collective control signal line that collectively controls the switching of the GND switches, wherein the potential applying unit applies a potential for closing the GND switch to the collective control signal line.

With the above construction, each of the row control signal lines is connected to the GND unit via the GND switch. By making use of the switch in this way, the row control signal lines can be connected to the GND unit only when necessary, and so the quantity of electrical power consumed can be kept in check.

Note also, the solid-state image pickup device may further include a resistive element that connects the GND unit that applies the opening potential and the row control signal line of each row, wherein the potential applying unit applies the opening potential to the control signal lines, making use of the high impedance of the row scan circuit with respect to the row control signal lines of non-selected rows.

With the above construction each of the row control signal lines is connected via a resistive element to the GND potential. By connecting resistive elements in a fixed manner in this way, the potential of the row control signal lines of the non-selected rows are held at the GND potential even though a special control circuit is not provided.

Note also, the solid-state image pickup device may further include: in each pixel, a separate read switch that opens and closes a connection between the photoelectric conversion unit that generates charge depending on the received light intensity and the charge holding unit; a plurality of read signal lines, each of which connects pixels of a same row, and controls the opening and closing of the read switches, row at a time, wherein the row scan circuit further (a) applies, to the read signal line of a selected row, one of an opening potential for opening the read switch and a closing potential for closing the read switch, makes the charge of the charge holding unit fluctuate by opening and then closing the read switch while the pixel is being rendered effective, and (b) goes to a high impedance with respect to signal lines of non-selected rows without applying either the opening potential or the closing potential, and the potential applying unit further applies the opening potential to the read signal line of non-selected rows for a period starting before and finishing after the rise of the output of the output circuit from a low potential to a high potential.

With the above construction, for a period starting before and finishing after the power source potential rises from a low potential to a high potential, the potential of the read signal line of a non-selected row is at an opening potential that opens the read switch. Hence, for this period at least, the row control signal lines for non-selected rows are not in a floating state. Thus, the rise in potential of the floating state read signal lines that accompanies the rise of the power source voltage due to the coupling capacitance disappears, and a situation in which the read switch is opened despite pixels being of a non-selected row does not arise.

Therefore, a lowering of the dynamic range of the solid-state image pickup device due to electric charge stored in the photoelectric conversion units leaking to the charge holding units can be suppressed.

Note also, when the row scan circuit is applying the opening potential to the read signal line of the selected row, the potential applying unit may apply the opening potential to all the read signal lines regardless of whether the rows are non-selected rows or selected rows.

The solid-state image pickup device selects one row via the scanning circuit, renders the pixels of the selected row effective and detects the pixel signals from the relevant pixels and then, after rendering the same pixels ineffective, sequentially performs the operation to select the next row. In summary, the selected row varies with time and is not fixed. Accordingly, where the operation to put the potential of read signal line at the opening potential is to be performed only on the read signal lines of non-selected rows, a special function for choosing only the read signal line of non-selected rows is required.

However, with the above construction, even though the row control signal line of the selected row is not in a floating state to begin with, by putting all of the row control signal lines to a common opening potential, the requirement for the special function is eliminated.

Note also, the solid-state image pickup device may further include a plurality of GND switches that open and close a connection between a GND unit that applies the opening potential and the read signal line for each row; and a collective control signal line that collectively controls the switching of the GND switches, wherein the potential applying unit applies a potential for closing the GND switch to the collective control signal line.

With the above construction, each of the read signal lines are connected to the GND unit via the GND switch. By making use of the switch in this way, the read signal lines can be connected to the GND unit only when necessary, and so the quantity of electrical power consumed can be kept in check.

Note also, the solid-state image pickup device may further include a resistive element that connects the GND unit, which applies the opening potential, and the read signal line of each row, wherein the potential applying unit applies the opening potential to the read signal lines, making use of the high impedance of the row scan circuit with respect to the read signal lines of non-selected rows.

With the above construction each of the read signal lines is connected via a resistive element to the GND potential. By connecting resistive elements in a fixed manner in this way, the potential of the read signal lines of the non-selected rows is held at the GND potential even though a special control circuit is not provided.

Note also, the row scan circuit may be constructed from dynamic logic using NMOS transistors.

With the above construction, the operation speed of the row scan circuit increases.

The image pickup method for the solid-state image pickup device of the present invention includes an image pickup method used in a solid-state image pickup device in which a plurality of pixels that each hold electric charge corresponding to a received light intensity in an electric charge holding unit are arranged in a matrix, each column of pixels is connected to a corresponding output line, each pixel outputs a pixel signal based on a fluctuation of the electric charge held in the charge holding unit of a pixel that has been rendered effective, and the pixel signal is detected via the output line, the solid-state image pickup device image pickup method including: a row scanning step of (a) sequentially selecting the rows, and, from the plurality of row control signal lines, each of which connects to pixels in a same row and controls the opening and closing of the power source switches in pixels of the same row, the power source switch opening and closing a connection between an output circuit which cyclically outputs high and low potentials and a charge holding unit in each pixel, (b) applying, to the row control signal line of a selected row, one of an opening potential for opening the power source switch and a closing potential for closing the power source switch, a pixel in the selected row being rendered effective by closing and then opening power source switch when an output of the output circuit is at a high potential, and then rendered ineffective by closing and then opening the power source switch when the output of the output circuit is at a low potential, and (c)the row scan circuit going to a high impedance with respect to row control signal lines of non-selected rows, without applying either the opening potential or the closing potential; and a potential applying step of applying the opening potential to the row control signal lines of non-selected rows for a period starting before and finishing after the rise of the output circuit output from a low potential to a high potential.

With the above construction, for a period starting before and finishing after the power source potential rises from a low potential to a high potential, the potential of the row control signal line of a non-selected row is at an opening potential that opens the power source switch. Hence, for this period at least, the row control signal lines for non-selected rows are not in a floating state. Thus, the rise in potential of the floating state row control signal lines that accompanies the rise of the power source voltage due to the coupling capacitance disappears, and a situation in which a signal is outputted despite pixels of a non-selected row does not arise.

Therefore, a lowering of the dynamic range of the solid-state image pickup device due to electric charge stored in the photoelectric conversion units leaking to the charge holding units can be suppressed.

Note also the solid-state image pickup device may further include: in each pixel, a separate read switch that opens and closes a connection between the photoelectric conversion unit that generates charge depending on the received light intensity and the charge holding unit; and a plurality of read signal lines, each of which connects pixels of the same row, and controls, row at a time, the opening and closing of the read switches, wherein further, in the row scanning step, one of an opening potential for opening the read switch and a closing potential for closing the read switch is applied to the read signal line of a selected row, the charge of the charge holding unit is made to fluctuate by closing and then opening the read switch while the pixel is being rendered effective, and the row scan circuit goes to a high impedance with respect to the signal lines of non-selected rows without applying either the opening potential or the closing potential, and in the potential applying step, the opening potential is applied to the read signal lines of non-selected rows for a period starting before and finishing after the rise of the output of the output circuit from a low potential to a high potential.

With the above construction, for a period starting before and finishing after the power source potential rises from a low potential to a high potential, the potential of the row control signal line of a non-selected row goes is at the opening potential that opens the read switch. Hence, for this period at least, the potential of the read signal lines for non-selected rows is not in a floating state. Thus, the rise in potential of read signal lines in a floating state that, due to the coupling capacitance, accompanies the rise of the power source voltage disappears, and a situation in which the read switch is opened despite the pixels being of a non-selected row does not arise.

Therefore, a lowering of the dynamic range of the solid-state image pickup device due to electric charge stored in the photoelectric conversion units leaking to the charge holding units can be suppressed.

BRIEF DESCRIPTION OF THE DRAWINGS

FIG. 9 shows the driving pulse of a solid-state image pickup device.

BEST MODE FOR CARRYING OUT THE INVENTION

Following is a detailed description of the embodiments of the present invention using the drawings.

First Embodiment

<Summary>

In this embodiment the rise in the gate potential of the reset transistor that accompanies the potential rise of the VDD-CELL is suppressed by connecting the reset signal line to GND for a period starting before and finishing after the potential of the VDCELL rises. Thus, the potential of the charge holding units in non-selected rows is held at a Lo potential, and pixels from non-selected rows no longer output a signal potential on the output signal line. Using this arrangement lowering of the dynamic range can be suppressed.

<Construction>

Figure 1:
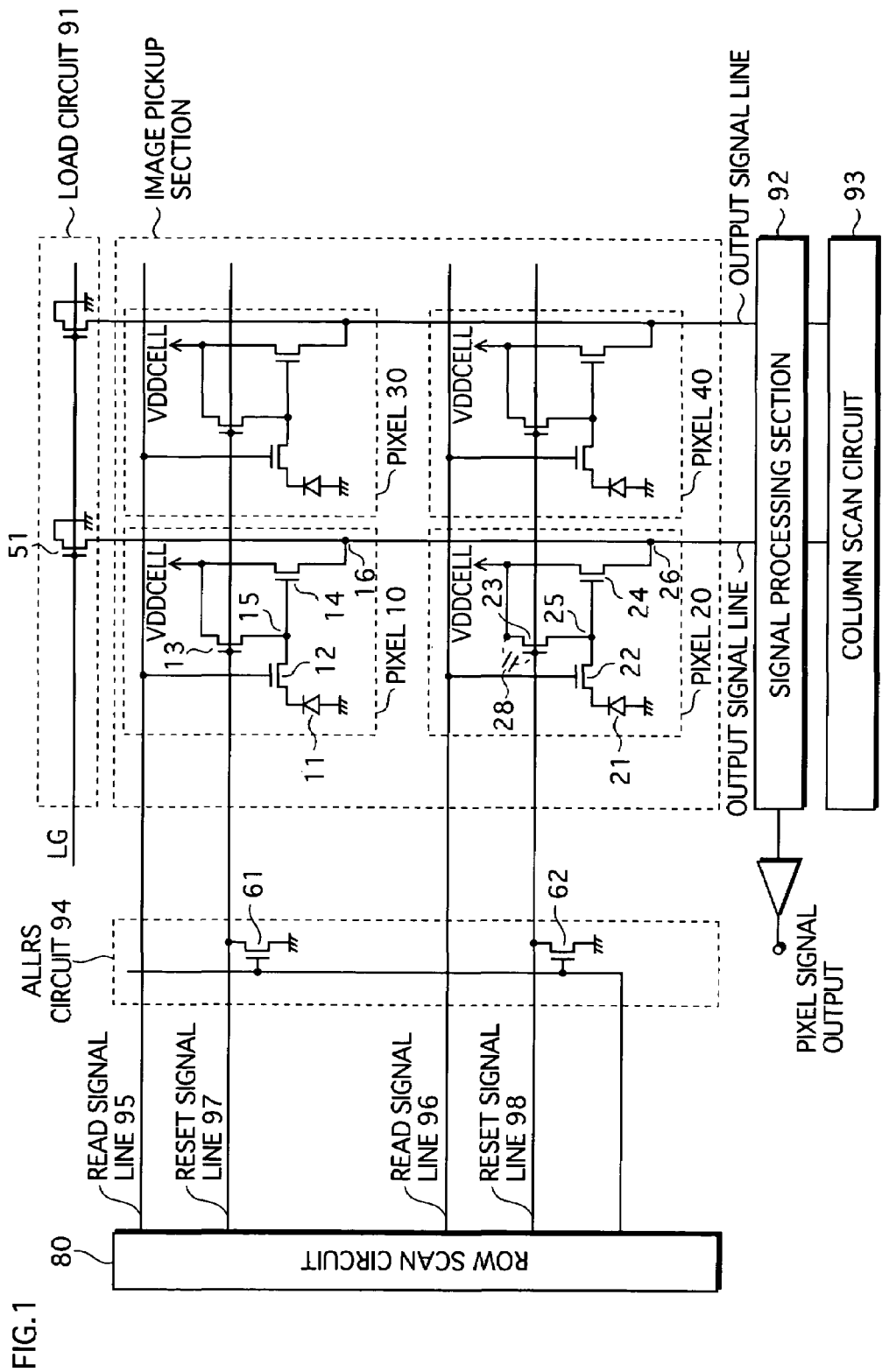
FIG. 1 shows the construction of a solid-state image pickup device of the First Embodiment.

FIG. 1 shows the construction of a solid-state image pickup device of the First Embodiment.

The solid-state image pickup device is composed of an image pickup section, a row scan circuit, a signal processing section, a load circuit, a column scan circuit and an ALLRS circuit, and is an arrangement in which each pixel reads off the output pixel signal, which depends on the received light intensity.

The pixels are disposed in a matrix pattern in the image pickup section. Each column of pixels is connected to a common output signal line, and each row of pixels is connected to common read line and a common reset signal line. The output signal line of each column is connected to a column scan circuit and a signal processing section, and the read signal line and reset signal line of each row are connected to a row scan circuit.

A pixel 10 is composed of a photoelectric conversion element 11, a read transistor 12, a reset transistor 13, an amplifying transistor 14, a charge holding unit 15, and an output terminal 16.

The photoelectric conversion element 11 generates a charge, which depends on the received light intensity.

The read transistor 12 is normally in an OFF state, going into an ON state only when the read pulse is at a Hi potential, at which time the photoelectric conversion unit 11 transmits the generated electric charge to the electric charge holding unit 15.

The charge holding unit 15 corresponds to a PN junction within the integrated circuit, maintains potential by holding the charge that it is given, and according to this potential, controls the flow of current from the VDDCELL to the output signal line via the amplifying transistor 14.

The reset transistor 13 is normally in an OFF state, going into an ON state only when the reset pulse is at a Hi potential.

Note also that the VDDCELL is a power source circuit that repeatedly cycles between a Hi potential and a Lo potential.

Since the pixel 10 is of the construction described above, when the VDDCELL is at a Hi potential and the reset transistor 13 goes into an ON state, the charge holding unit 15 goes to a Hi potential. Following this, the amplifying transistor 14 goes to an ON state, current flows from the VDDCELL to the output terminal 16, and the output signal line potential rises to a reference potential. Then, when the photoelectric conversion element 11 and the charge holding unit 15 are made to conduct by putting the read transistor 12 in an ON state, the potential of the charge holding unit 15 drops according to the amount of charge generated in the photoelectric conversion element 11. Depending on the extent of drop, the potential of the output signal line drops via the action of the amplifying transistor 14. The potential on the output signal line becomes the signal potential. The signal processing section detects the above described potential difference between the reference potential and the signal potential as the pixel signal. Then, when the VDDCELL is at a Lo potential and the reset transistor 13 goes into an ON state, the charge holding unit 15 goes to a Lo potential. Following this, the amplifying transistor 14 goes into an OFF state.

Thus, the pixel 10 can be rendered effective by switching the reset transistor 13 from an ON state to an OFF state when the VDDCELL is at a Hi potential, and rendered ineffective by switching the reset transistor 13 from an ON state to an OFF state when the potential of the VDDCELL is Lo. Also, the pixel signal is read off in the period after the pixel has been rendered effective and before the pixel signal is rendered ineffective. Other pixels have a structure similar to the pixel 10, so their description is omitted.

The row scan circuit 80 is a circuit that selects one row and provides a reset pulse on the reset signal line to render all the pixels in the selected row effective, then makes the pixel output the signal potential by providing a read pulse on the read signal line, and provides a reset pulse on the reset signal line to render all the relevant pixels ineffective. The row scan circuit 80 scans row after row, the operations described above being a single cycle in the scanning process. Note also that the row scan circuit 80 is constructed using dynamic logic in which NOMS transistors are used.

The load circuit 91 is a circuit for providing a fixed current in the output signal line when the signal processing section 92 is detecting the potential of the output signal line.

The column scanning unit 93 is a circuit for selecting a specific column for the signal processing section 92. With this arrangement, the signal processing section 92 can output the pixel signals read off from the selected row in order, column at a time.

ALLRS circuit 94 is a circuit composed of ground transistors 61 and 62 which connect the reset lines to GND, whose ON state and OFF state are controlled by the ALLRS pulse. Due to this, for the period that the ALLRS pulse is at a Hi potential, GND transistors 61 and 62 go into an ON state, and the potential of the reset signal line goes to the GND potential.

If the row scan circuit 80 is constructed with dynamic logic using NMOS transistors, when for example the row including the pixel 10 is selected and the row including the pixel 20 is non-selected, the potential of the reset signal line 97 of the selected row is at Hi potential only when the row scan circuit 80 provides a reset pulse, and is otherwise at a Lo potential. Further, the potential of the reset signal line 98 of the non-selected rows is in a floating state.

With this kind of arrangement, when the VDDCELL rises from a Lo potential to a Hi potential, the gate potential of reset transistor 23 rises because of the effect of the coupling capacitance 28 inherent in pixel 20. When this happens, the reset transistor 23 goes into an ON state, the charge holding unit 25 goes to an undesirable Hi potential, and current flows in the amplifying transistor 24. Due to this, the potential of the output signal line is altered and the dynamic range of the solid-state image pickup device is lowered.

However, an OFF state can be maintained in the reset transistor 23 by fixing the potential of the reset signal line at the GND potential when the VDDCELL is switching from a Lo potential to a Hi potential due to the ALLRS circuit 94, and ensuring that the reset line does not go into a floating state. With this arrangement, a situation in which current flows in the output signal line despite the pixels being of a non-selected row can be prevented, and the lowering of the dynamic range can be suppressed.

Figure 2:
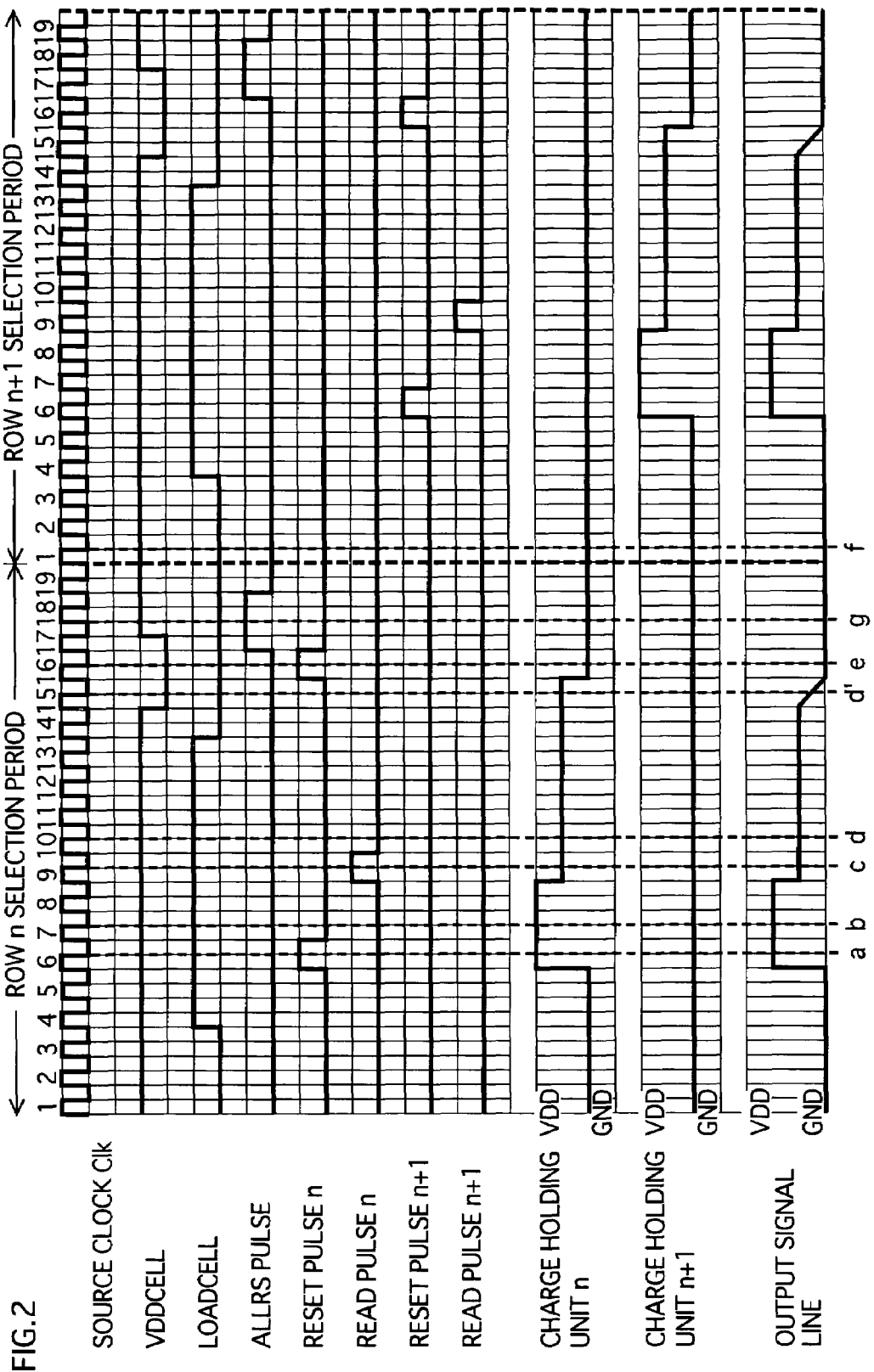
FIG. 2 shows the driving pulse of a solid-state image pickup device.

FIG. 2 shows the driving pulse for a solid-state image pickup device.

A distinctive feature of the driving pulse of the present embodiment is that, at point g in FIG. 2, an ALLRS pulse is provided over the period that the potential of the VDCELL rises from a Lo potential to a Hi potential. With this arrangement the GND transistors 61 and 62 go into an ON state and the reset signal line of each cell is connected to GND.

Also, over the period that the potential of the VDDCELL rises from a Lo potential to a Hi potential in this way, the reset signal lines are connected to GND, so even with the coupling capacitances existing in the reset transistors of the non-selected rows, the gate potentials do not fluctuate. Thus, the potential of the charge holding unit of non-selected rows is held at a Lo potential, a situation in which current flows despite the pixels being of a non-selected row can be prevented. Due to this, the lowering of the dynamic range of a solid-state image pickup device can be suppressed even if a row scan circuit constructed using dynamic logic with NMOS transistors is used.

Note also that, in the present embodiment, the ALLRS pulse is timed to go to a Hi potential on the rise of the $17^{th}$ cycle of the source clock, and timed go to a Lo potential on the rise of the 19$^{th}$ cycle, but this timing may vary provided that the period over which the VDDCELL rises from a Lo potential to a Hi potential (18$^{th}$ cycle) is covered and periods that reset pulse n is at a Hi potential are avoided.

The construction of the row scan circuit 80, which generates the various pulses described above, is described in detail below.

Figure 3:
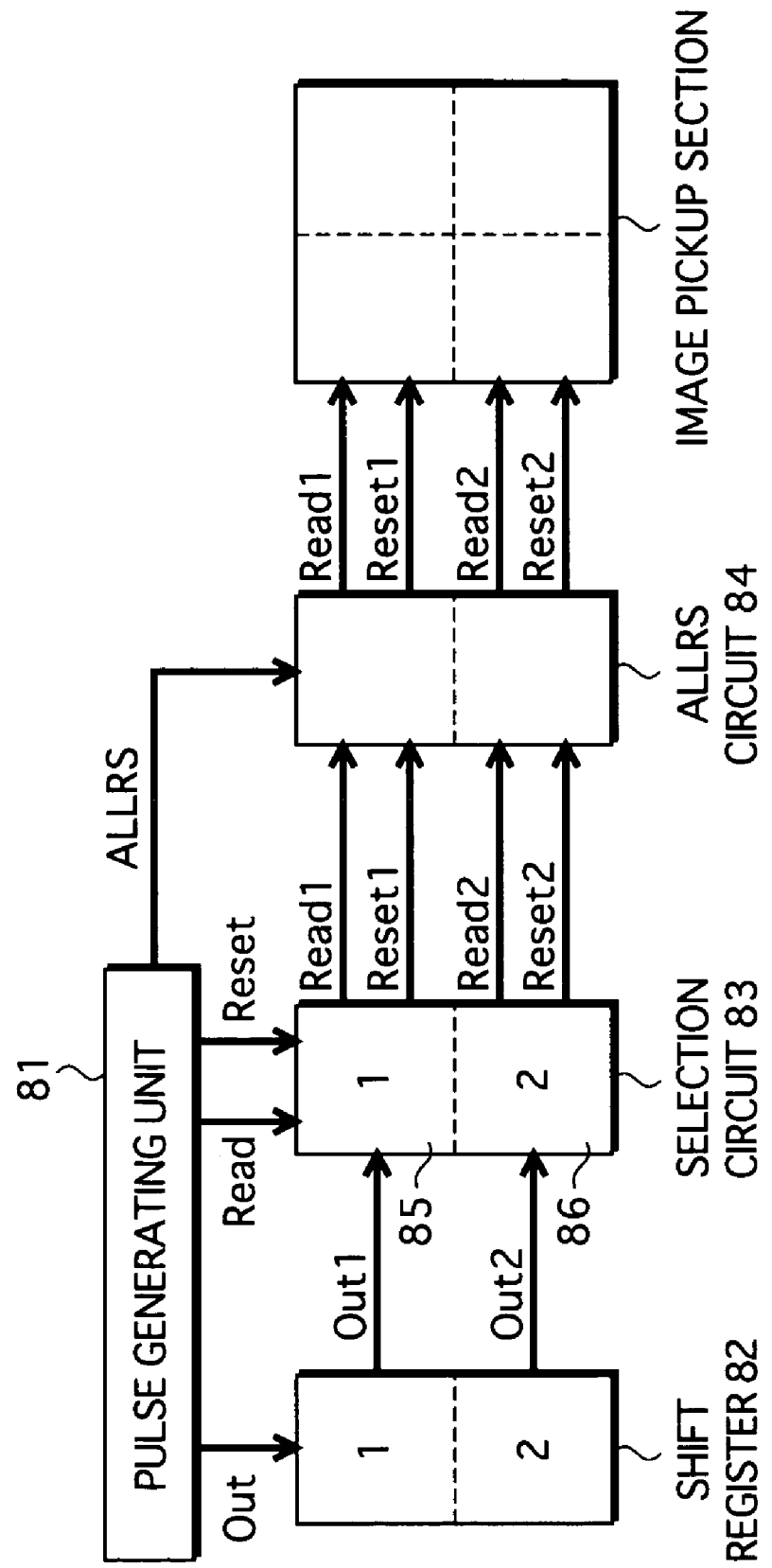
FIG. 3 shows the construction of a row scan circuit.

FIG. 3 shows the construction of the row scan circuit.

Figure 4:
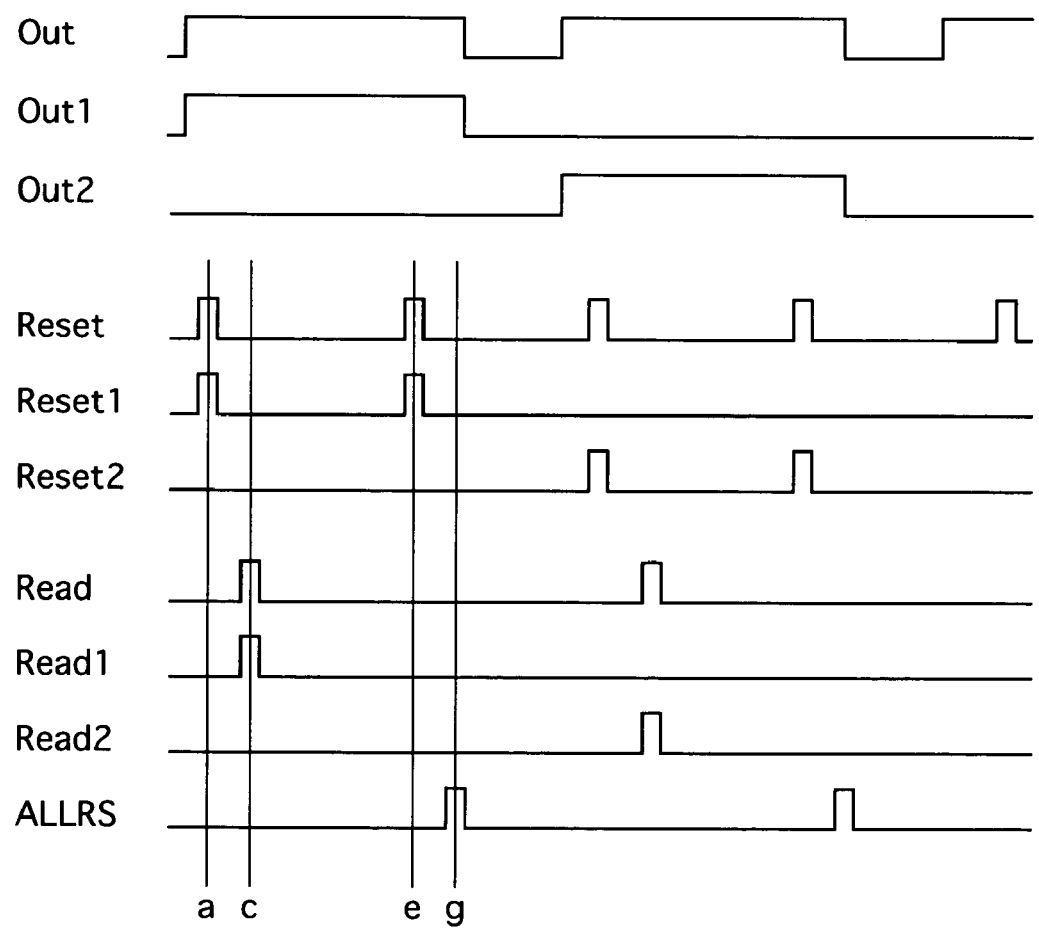
FIG. 4 shows the pulse outputted from each component of the row scan circuit.
Figure 5A:
FIG. 5 shows one example of a logic circuit that generates a VDDCELL, a reset pulse, an ALLRS pulse.
Figure 5B:
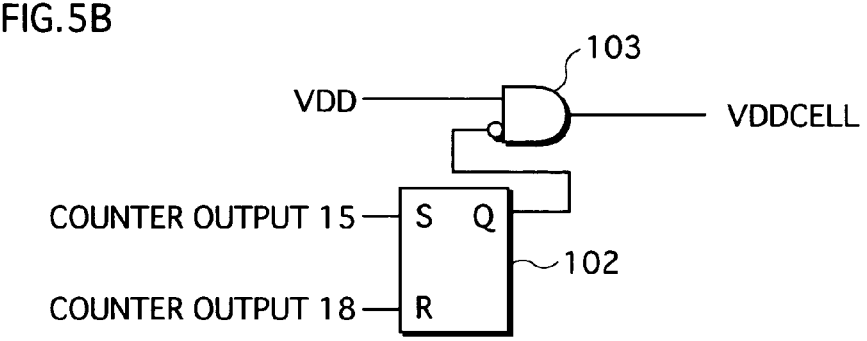
Figure 5C:
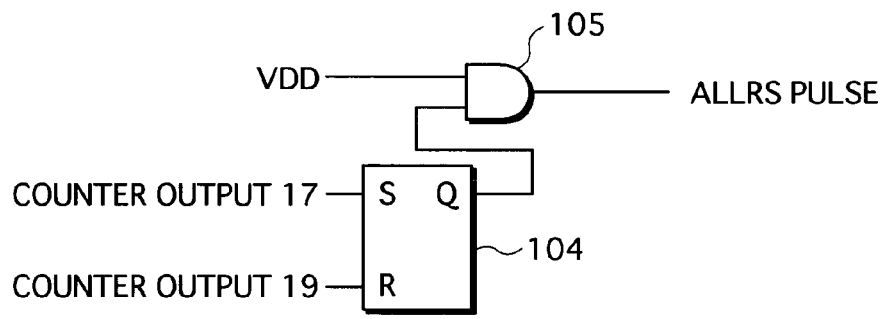
Figure 5D:
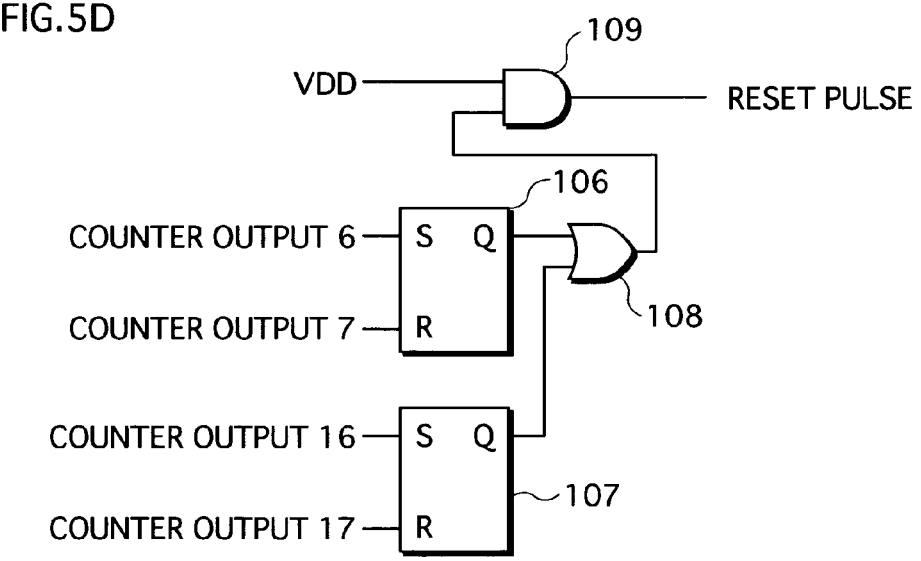

Also FIG. 4 shows the pulse outputted from each component of the row scan circuit of FIG. 3.

The row scan circuit is composed of a pulse generating unit 81, a shift register 82 and a selection circuit 83.

The pulse generating unit 81 is made up of counters and the like, and generates and outputs pulses of a fixed width with a predetermined timing that is based on the source clock Clk shown in FIG. 2.

The pulse generating unit 81 generates an output signal Out, a read pulse Read and a reset pulse Reset, which are based on the source clock, and are at a Hi potential at different times, the output signal Out being outputted to the shift register 82, the read pulse Read and the reset pulse Reset to the selection circuit 83, and the ALLRS pulse to the ALLRS circuit 84.

The shift register 82 generates Out 1 and Out 2, which are at a Hi potential at differing times, based on the ouput signal Out, and outputs them from separate terminals.

The selection circuit 83 receives the Read and Reset generated by the pulse generating unit 81. A cell 85 of the selection circuit has an AND circuit which outputs the logical product of Out and Read as Read 1, and an AND circuit which outputs the logical product of Out and Reset as Reset 1. Similarly, a cell 86 of the selection circuit also has two AND circuits.

Read 1 and Read 2, and Reset 1 and Reset 2 which have been outputted by the selection circuit, are inputted into the image pickup section via the ALLRS circuit 84.

Read 1 and Reset 1 outputted in this way are the read pulse n and the reset pulse n respectively of FIG. 2, Read 2 and Reset 2 are the read pulse n+1 and the reset pulse n+1 respectively of FIG. 2, and ALLRS corresponds to the ALLRS pulse of FIG. 2.

FIG. 5 shows one example of a logic circuit that generates a VDDCELL, a reset pulse, and an ALLRS pulse.

A counter 101 shown in (a) indicates counts pulses from source clock Clk shown in FIG. 2, and outputs the count as the counter output. Further, in the present embodiment, with user operations (for example, a user shutter operation if the solid-state image pickup device is being used as a digital camera) working as trigger, the counter counts from the 1$^{st}$ cycle and resets on the 19$^{th}$ cycle.

(b) shows the logic circuit which generates the VDDCELL shown in FIG. 2. The VDDCELL is generated using an SR latch 102 and an AND element 103.

The SR latch 102 is set when the counter output is 15 and is reset at 18. Also, the AND element 103 outputs the logical product of the reversed output of the SR latch 102 and the VDD that is held fixed at a Hi potential.

With this arrangement, the VDDCELL is at a Lo potential from the rise in the 15$^{th}$ cycle to the rise in the 18$^{th}$ cycle of the source clock, and is otherwise at Hi potential.

(c) shows the logic circuit which generates the ALLRS pulse shown in FIG. 2. The ALLRS pulse is generated by an SR latch 104 and an AND element 105.

The SR latch 104 is set when the counter output is 17, and reset when the counter output is 19. The AND element 105 outputs the logical product of the output of the SR latch 104 and the VDD.

With this arrangement, the ALLRS pulse is at a Hi potential from the rise in the 17$^{th}$ cycle to the rise in the 19$^{th}$ cycle of the source clock, and is otherwise at a Lo potential.

(d) shows the logic circuit which generates the reset pulse Read shown in FIG. 3. Reset pulse Read is generated from an SR latch 106, an SR latch 107, an OR element 108, and an AND element 109.

The SR latch 106 is set when the counter output is 6, and reset when the counter output is 7. The SR latch 107 is set when the counter output is 16 and reset when the counter output is 17. The OR element 108 outputs the logical sum of the output of the SR latch 106 and the output of the SR latch 107. The AND element 109 outputs the logical product of the output of the OR element 108 and the VDD.

With this arrangement, the reset pulse Read is at a Hi potential from the rise of the 6$^{th}$ cycle to the rise of the 7$^{th}$ cycle and from the rise of the 16$^{th}$ cycle to the rise of the 17$^{th}$ cycle of the of the source clock, and is otherwise at a Lo potential.

In this manner pulses of a predetermined width are generated based on the predetermined timing of the source clock to be used as the various pulses in the solid-state image pickup device.

Figure 6:
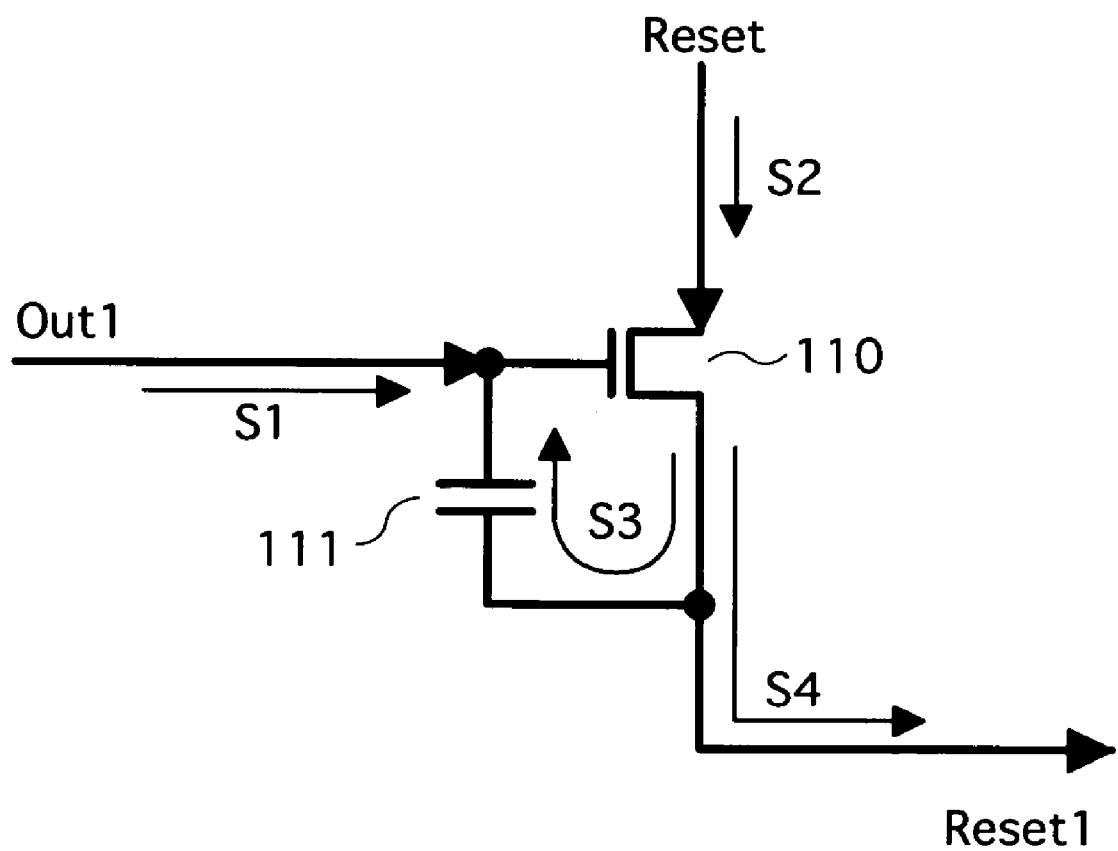
FIG. 6 shows the construction of an AND circuit within a selection circuit.

FIG. 6 shows the configuration of the AND circuit within the selection circuit of FIG. 3.

Figure 7:
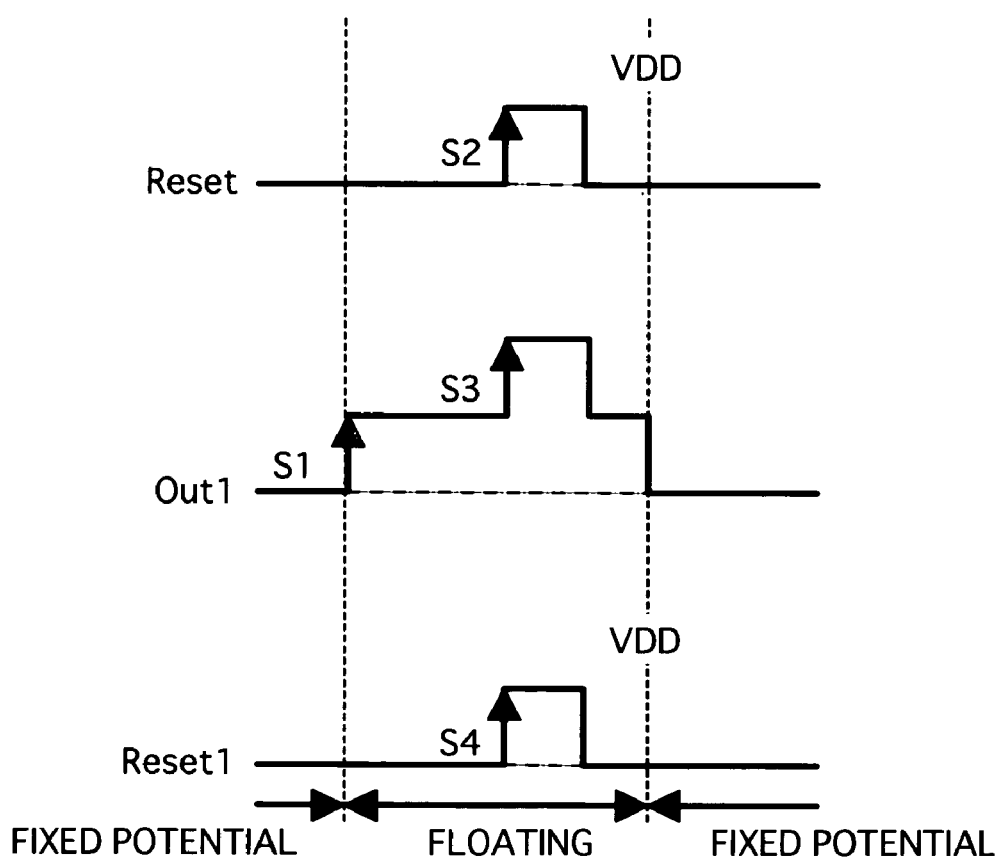
FIG. 7 shows the pulse of the AND circuit.

Further, FIG. 7 shows the pulse of the AND circuit of FIG. 6.

The AND circuit is composed of an AND transistor 110 and a capacitor 111. In FIG. 6, the AND circuit that outputs the logical product of Out 1 and Reset is shown, but other AND circuits such as the one that outputs the logical product of Out 1 and Read are of a similar composition.

The Reset is inputted to the drain of the AND transistor 110 and the output potential is controlled via the Out 1 potential which is inputted to the gate. When a Hi potential is inputted as Out 1 (FIG. 7, S1) the gate potential of the AND transistor rises and the transistor goes into an ON state. At this time, the drain and the source are connected, and the AND transistor 110 outputs the Reset potential. In other words, if the Reset is at a Lo potential a Lo potential is outputted as Reset 1. Further, when Reset is at Hi potential (FIG. 7, S2) Reset 1 is at a Hi potential accordingly (FIG. 7, S4).

Further, this AND circuit has a boot strap circuit, which raises the potential usage ratio by further raising the gate potential via the capacitor 111 (FIG. 7 S3), during the period that a Hi potential is being outputted as Reset 1.

In this way, only when the Out 1 is at a Hi potential does the output terminal of the AND circuit go to a Hi potential or a Lo potential depending on the Reset potential. When the Out 1 is at a Lo potential, the output terminal goes to a high impedance because the AND transistor 110 is in an OFF state. Thus, the reset signal line that connects to the output terminal of the AND circuit is at fixed potential only when Out 1 is at a Hi potential, and is in a floating state when Out 1 is at a low potential.

<Operation>

The various operation steps of the solid-state image pickup device are explained in detail below with reference to FIG. 2.

(1) To make the potential of the charge holding unit 15 go to the Hi potential of the VDDCELL and render the pixel effective, the reset pulse n goes to a Hi potential and the reset transistor 13 goes into an ON state. Due to this, the potential of charge holding unit 15 goes to a high potential, a potential depending on the potential of the charge holding unit 15 is outputted from the output terminal 16 of the amplifying transistor 14, and the potential of the output signal line rises. (FIG. 2, point a).

(2) The reset pulse n goes to a low potential, and the reset transistor 13 goes into an OFF state. At this time, the charge holding unit 15 maintains a Hi potential. (FIG. 2 point b)

(3) The read pulse n goes to a Hi potential, and the read transistor 12 goes into an ON state. Due to this, the electric charge stored in the photoelectric conversion element 11, which depends on the light information, is read by the charge holding unit 15, resulting in a drop of the potential of the charge holding unit 15. The potential of the output terminal 16 of the amplifying transistor 14 drops in accordance with the drop in the potential of the charge holding unit 15, and hence, the potential of the output signal line drops (FIG. 2 point c).

(4) The read pulse n goes to a Lo potential, and the read transistor 12 goes into an OFF state (FIG. 2 point d). The signal processing section detects the potential of the output signal line at point b and the potential of the output signal line at point d, and reads the difference between these two potentials as the pixel signal. After this, VDDCELL goes to a Lo potential (FIG. 2 point d').

(5) After the Hi potential of the VDDCELL has dropped to a Lo potential, to make the potential of the charge holding unit 15 go to the Lo potential of the VDD CELL and render the pixel in effective, the reset pulse n goes to a Hi potential, and the reset transistor 13 goes into an ON state. Due to this, the potential of the charge holding unit 15 goes to a Lo potential, and the amplifying transistor 14 goes into an OFF state. This completes the pixel signal output operations of the pixel 10 (FIG. 2 point e).

(6) After the reset pulse n has gone to a Lo potential and the reset transistor 13 has gone into an OFF state, the ALLRS pulse goes to a Hi potential for a time period starting before and finishing after the rise of the VDDCELL Lo potential to a Hi potential. Due to this, the reset signal line is connected to GND, and for this period, the reset transistor gate potential is fixed at the GND potential (FIG. 2, point g).

(7) After this, the nth row becomes a non-selected row and the n+1$^{th}$ row becomes the selected row (FIG. 2, point f).

By having the ALLRS pulse go to a Hi potential for the time period starting before and finishing after the rise of the VDDCELL Lo potential to a Hi potential in this way, the reset transistor gate potential is fixed at the GND potential, and the rise in the gate potential that accompanies the rise of the VDDCELL is suppressed. Thus a situation in which current flows in spite of a row not being selected can be prevented. Hence, the lowering of the dynamic range of a solid-state pickup device can be suppressed, even when a row scan circuit constructed from dynamic logic with NMOS transistors is used.

Note that provided that the gate potential of the reset transistor is prevented from rising when the Lo potential of the VDDCELL goes to a Hi potential, the GND transistor described above is not prerequisite. Other realization means may be used.

For example, a method depending on a pull-down circuit provided with resistors instead of the GND transistors 61 and 62 may be-considered. If this method is used, it is desirable that the resistance of the resistors is 200 kΩ or more. The reasons for this are described below.

The driver circuit within the row scan circuit is provided in series between the driving circuit and the pull-down circuit. Generally, since the driver circuit has an ON resistance value (Rdr) of a several kΩ, a voltage drop (SIGh) depending on the resistance value of the pull-down circuit (Rpd) is generated in the reset pulse that is given to each pixel. The voltage drop (SIGh) is calculated according to the following formula.

SIGh=VDD*Rpd/(Rpd+Rdr)

Here, VDD indicates the source voltage.

If the source voltage is to fall, it is desirable to suppress this source voltage drop to within two percent, so Rpd must be at least fifty times the resistance values of Rdr. Hence, it is desirable that the resistance of the pull down circuit should be at least 200 kΩ.

Second Embodiment

<Summary>

The present embodiment not only prevents the gate potential of the reset transistor rising together with the rise in the VDDCELL potential, but also prevents the gate potential of the read transistor from rising, and thereby suppresses a lowering of the dynamic range that arises due to the connection between the charge holding unit and the photoelectric conversion element in the pixels of non-selected rows.

<Construction>

Figure 8:
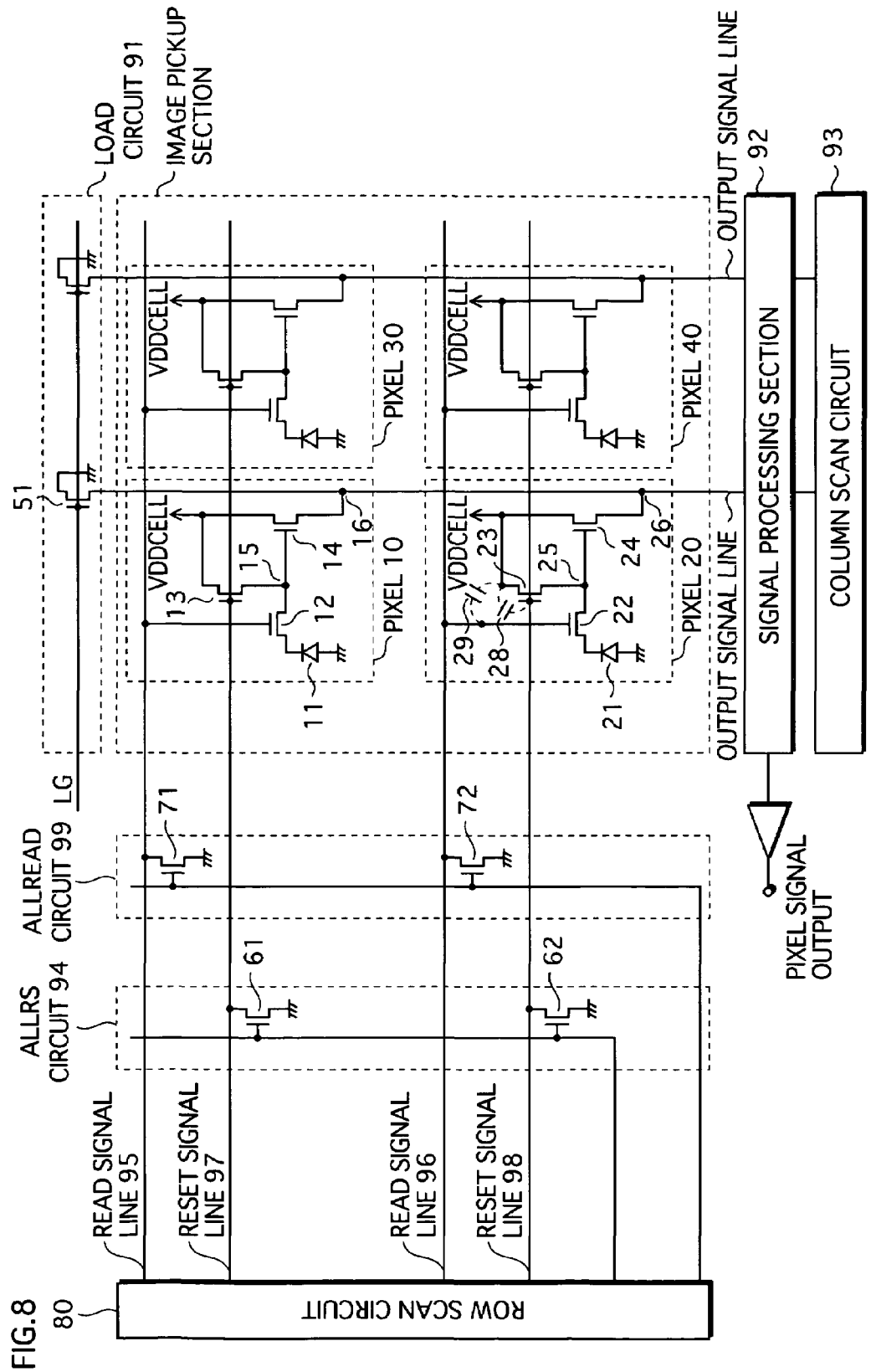
FIG. 8 shows the construction of a solid-state image pickup device of the Second Embodiment.

FIG. 8 shows the construction of a solid-state pickup device of the Second Embodiment.

The construction of the solid-state image pickup device of the present embodiment is, an ALLREAD circuit 99 and a coupling capacitance 29 aside, of a similar construction to the First Embodiment, so the construction of the Second Embodiment is described only where it differs from that of the First Embodiment, and is omitted where the two constructions are similar.

Due to the layout of the various components in the integrated circuit, the coupling capacitance 29 is inherent between the gate of the read transistor 22 and the VDDCELL. Where the row scan circuit 80 is constructed from dynamic logic using NMOS transistors, the gate of the read transistor 22 goes into a floating state when non-selected in the same way as the gate of the reset transistor 23. Thus, as the VDDCELL potential rises there is a possibility that the gate potential of the read transistor 22 will rise due to the effects the coupling capacitance 29. If this happens, read transistor 22 goes into an ON state, the charge being stored in the photoelectric conversion element 11 leaks, an accurate pixel signal can no longer be obtained and a lowering of the dynamic range is caused.

In view of this, the present embodiment is constructed with GND transistors 71 and 72 as an ALLREAD circuit supplementary to the construction of the First Embodiment.

The ALLREAD circuit 99 is composed of the GND transistors 71 and 72 that connect the read signal lines to GND, and whose ON state and OFF state are controlled by an ALLREAD pulse. With this construction, for the period that the ALLREAD pulse is at a Hi potential, the GND transistors 71 and 72 are in an ON state, and the potential of the reset signal line is the GND potential.

FIG. 9 shows the driving pulses of the solid-state image pickup device.

The driving pulses of the present embodiment are distinctive in that, at point h in FIG. 9, the ALLRS pulse and the ALLREAD pulse are at a Hi potential for the period over which the VDDCELL potential rises from a Lo potential to a Hi potential. Under these conditions, the GND transistors 61, 62, 71 and 72 are in an ON state, and the reset signal line and read signal line of each row are connected to GND.

Further, since the read signal line and the reset signal line are connected to GND over the period that the VDDCELL potential rises, the gate potentials of reset transistor 23 and read transistor 22 do not rise, even when coupling capacitance 28 and coupling capacitance 29 are present in the pixels of non-selected rows.

Thus, the charge holding unit 25 potential in non-selected rows is held Lo. In short, a situation in which current flows in rows even though they are non-selected can be prevented. Moreover, with the read transistors of non-selected rows in an ON state, leakage of the charge stored in the photoelectric conversion elements 21 and the like does not occur. Hence, even when the row scan circuit is constructed from dynamic logic using NMOS transistors, a lowering of the dynamic range in the solid-state image pickup device can be suppressed.

Note also that, as shown in FIG. 9, where a method in which the ALLREAD pulse and the ALLRS pulse go to a Hi potential with identical timing, the ALLRS pulse generating circuit can be shared if a circuit to generate the ALLREAD pulse is not separately provided.

Further, as long as the ALLREAD pulse is at a Hi potential over a period covering the transition of the source potential from a Lo potential to a Hi potential, it is not necessary that the ALLRS pulse and the ALLREAD pulse have identical timings. Here, in the case where a circuit to generate the ALLREAD pulse is separately provided, the generation of the ALLREAD pulse can be achieved in much the same way as described for the First Embodiment. Specifically, the ALLREAD pulse can be generated from the logical product of the VDD and the output from an SR latch.

<Operations>

Each step in the operation of the solid-state image pickup device is described below in definite terms with reference to FIG. 9.

(1) To make the potential of the charge holding unit 15 go to the Hi potential of the VDDCELL and render the pixel effective, the reset pulse n goes to a Hi potential and the reset transistor 13 goes into an ON state. Due to this, the potential of the charge holding unit 15 goes to a Hi potential, a potential depending on the potential of the charge holding unit is outputted from the output terminal 16 of the amplifying transistor 14, and the potential of the output signal line rises (FIG. 9, point a).

(2) The reset pulse n goes to a Lo potential, and the reset transistor 13 goes into an OFF state. At this time, the charge holding unit 15 maintains a Hi potential (FIG. 9, point b).

(3) The read pulse n goes to a Hi potential, and the read transistor 12 goes into an ON state. Due to this, the electric charge stored in the photoelectric conversion element 11, which depends on the light information, is read by the charge holding unit 15, causing the potential of the charge holding unit 15 to drop. The potential of the output terminal 16 of the amplifying transistor 14 drops in accordance with the drop of the potential of the charge holding unit 15, and hence, the potential of the output signal line drops (FIG. 9, point c).

(4) The read pulse n goes to a Lo potential, and the read transistor 12 goes into an OFF state (FIG. 9, point d). The signal processing section detects the potential of the output signal line at point b and the potential of the output signal line point d, and reads the difference between these two potentials as the pixel signal. After this, the VDDCELL goes to a Lo potential (FIG. 9, point d').

(5) After the Hi potential of the VDDCELL has dropped to a Lo potential, to make the potential of the charge holding unit 15 go to the Lo potential of the VDDCELL and render the pixel ineffective, the reset pulse n goes to a Hi potential, and the reset transistor 13 goes into an ON state. Due to this, the potential of the charge holding unit 15 goes to a Lo potential, and the amplifying transistor 14 goes into an OFF state. This completes the pixel signal output operations of the pixel 10 (FIG. 9, point e).

(6) After the reset pulse n has gone to a Lo potential and the reset transistor 13 has gone into an OFF state, the ALLRS pulse and the ALLREAD pulse go to a Hi potential for a time period covering the rise of the potential of the VDDCELL from a Lo potential to a Hi potential. Due to this, the reset signal line and the read signal line are connected to GND and, for this period, the reset transistor and read transistor gate potentials are fixed at the GND potential (FIG. 9, point h).

(7) After this, the $n_{th}$ row becomes a non-selected row and the $n+1^{th}$ row becomes the selected row (FIG. 9, point g).

By having the ALLREAD pulse go to a Hi potential for the time period covering the rise of the potential of the VDDCELL from a Lo potential to a Hi potential in this way, the read transistor gate potential is fixed at the GND potential, and the rise in the gate potential that accompanies the rise of the VDDCELL is suppressed. Due to this, the type of situation in which the read transistor goes into an ON state, and the charge stored in the photoelectric elements leaks away is eliminated.

As for the ALLRS pulse, by having the ALLREAD pulse go to a Hi potential for the time period covering the rise of the potential of the VDDCELL from a Lo potential to a Hi potential in a similar manner to the First Embodiment, the reset transistor gate potential is fixed at the GND potential, and the rise in the gate potential that accompanies the rise of the VDDCELL is suppressed. Thus a situation in which current flows in spite of a row not being selected can be prevented.

Hence, the lowering of the dynamic range of a solid-state pickup device can be suppressed, even when a row scan circuit constructed from dynamic logic with NMOS transistors is used.

Note that, in the Second Embodiment, provided that the gate potentials of the reset transistor and read transistor is prevented from rising when the Lo potential of the VDDCELL goes to a Hi potential, the GND transistors described above are not prerequisite. Other realization means may be used.

For example, a means employing a pull-down circuit to replace the GND transistors 61, 62, 71 and 72 may used. In such a case, it is desirable that the resistance of the pull-down circuit is 200 kΩ or more for the same reasons as in the First Embodiment.

Note also that while, in the Second Embodiment, while the ALLRS circuit for setting the gate potential of the reset transistor to the ground potential and the ALLREAD circuit for setting the gate potential of the read transistor to the ground potential are combined, in the case where it is not necessary to have the gate potential of the reset transistor at the GND potential, it is acceptable to suppress the dynamic range by setting only the ALLRD circuit to the GND potential.

Note also that while, in the First Embodiment, the GND transistors 61 and 62 are jointly controlled by the ALLRESET pulse, this does not have to be the case. For example, a type of control in which the GND transistors 61 and 62 are controlled via separate control lines, the GND transistors in non-selected rows going into an ON state and the GND transistors in the selected row going into an OFF state when the VDCELL goes high, may be used.

INDUSTRIAL APPLICABILITY

The present invention can be utilized in the pixel sand driving components of digital cameras, digital video cameras and the like.

The invention claimed is:

1. A solid-state image pickup device in which a plurality of pixels are arranged in a matrix, each column of pixels in the matrix being connected to a corresponding output line, each pixel having a charge holding unit that holds an electric charge corresponding to a received light intensity, and when rendered effective, outputting a pixel signal based on a fluctuation of the electric charge held in the charge holding unit, the pixel signal being detected via the output line, the solid-state image pickup device comprising:

a separate reset switch in each pixel, the reset switch opening and closing a connection between the charge holding unit in the pixel and an output circuit which repeatedly outputs a cycle of high and low potentials;

a plurality of row control signal lines, each connecting to pixels in a row, and controlling the opening and closing of the reset switches in the pixels in the row;

a row scan circuit that (a) selects rows sequentially, (b) applies, to the row control signal line of a selected row, one of a low potential for opening the reset switch and a high potential for closing the reset switch, a pixel in the selected row being rendered effective by closing and then opening the reset switch when an output of the output circuit is at a high potential, and then rendered ineffective by closing and then opening the reset switch when the output of the output circuit is at a low potential, and (c) goes to a high impedance with respect to the row control signal lines of non-selected rows without applying either the low potential or the high potential; and an ALLRS circuit operable to apply the low potential to the row control signal lines of non-selected rows for a period starting before and finishing after the rise of the output circuit output from a low potential to a high potential.

2. The solid-state image pickup device of claim 1, wherein when the row scan circuit is applying the low potential to the row control signal line of the selected row, the ALLRS circuit applies the low potential to all the row control signal lines regardless of whether the rows are non-selected rows or selected rows.

3. The solid-state image pickup device of claim 1, wherein the ALLRS circuit includes:

plurality of GND switches, each of which opens and closes a connection between a GND unit that applies the low potential and the row control signal line for each row; and a collective control signal line that collectively controls the switching of the GND switches, and closes the GND switch for a period starting before and finishing after the rise of the output circuit output from a low potential to a high potential.

4. The solid-state image pickup device of claim 1, further comprising:

in each pixel, a separate read switch that opens and closes a connection between the photoelectric conversion unit that generates charge depending on the received light intensity and the charge holding unit;

a plurality of read signal lines, each of which connects pixels of a same row, and controls the opening and closing of the read switches, row at a time, an ALLREAD circuit that applies a low potential to the read signal line of non-selected rows for a period starting before and finishing after the rise of the output of the output circuit from a low potential to a high potential, wherein the row scan circuit further (a) applies, to the read signal line of a selected row, one of a low potential for opening the read switch and a high potential for closing the read switch, makes the charge of the charge holding unit fluctuate by opening and then closing the read switch while the pixel is being rendered effective, and (b) goes to a high impedance with respect to signal lines of non-selected rows without applying either the low potential or the high potential.

5. The solid-state image pickup device of claim 4, wherein when the row scan circuit is applying the low potential to the read signal line of the selected row, the ALLREAD circuit applies the low potential to all the read signal lines regardless of whether the rows are non-selected rows or selected rows.

6. The solid-state image pickup device of claim 5, wherein the ALLREAD circuit includes:

a plurality of GND switches that open and close a connection between a GND unit that applies the low potential and the read signal line for each row; and a collective control signal line that collectively controls the switching of the GND switches, and closes the GND switch for a period starting before and finishing after the rise of the output circuit output from a low potential to a high potential.

7. The solid-state image pickup device of claim 1, wherein the row scan circuit is constructed from dynamic logic using NMOS transistors.

8. An image pickup method used in a solid-state image pickup device in which a plurality of pixels that each hold electric charge corresponding to a received light intensity in an electric charge holding unit are arranged in a matrix, each column of pixels is connected to a corresponding output line, each pixel outputs a pixel signal based on a fluctuation of the electric charge held in the charge holding unit of a pixel that has been rendered effective, and the pixel signal is detected via the output line, the solid-state image pickup device image pickup method comprising:

a row scanning step of (a) sequentially selecting the rows, and, from the plurality of row control signal lines, each of which connects to pixels in a same row and controls the opening and closing of reset switches in pixels of the same row, the reset switch opening and closing a connection between an output circuit which cyclically outputs high and low potentials and a charge holding unit in each pixel, (b) applying, to the row control signal line of a selected row, one of a low potential for opening the reset switch and a high potential for closing the reset switch, a pixel in the selected row being rendered effective by closing and then opening the reset switch when an output of the output circuit is at a high potential, and then rendered ineffective by closing and then opening the reset switch when the output of the output circuit is at a low potential, and (c) the row scan circuit going to a high impedance with respect to row control signal lines of non-selected rows, without applying either the low potential or the high potential; and an ALLRS step of applying the low potential to the row control signal lines of non-selected rows for a period starting before and finishing after the rise of the output circuit output from a low potential to a high potential.

9. The solid-state image pickup method of claim 8, the solid-state image pickup device further comprising:

in each pixel, a separate read switch that opens and closes a connection between the photoelectric conversion unit that generates charge depending on the received light intensity and the charge holding unit; and a plurality of read signal lines, each of which connects pixels of the same row, and controls, row at a time, the opening and closing of the read switches, wherein further, in the row scanning step, one of a low potential for opening the read switch and a high potential for closing the read switch is applied to the read signal line of a selected row, the charge of the charge holding unit is made to fluctuate by closing and then opening the read switch while the pixel is being rendered effective, and the row scan circuit goes to a high impedance with respect to the signal lines of non-selected rows without applying either the low potential or the high potential, and the image pickup method further comprises:

an ALLREAD step in which the low potential is applied to the read signal lines of non-selected rows for a period starting before and finishing after the rise of the output of the output circuit from a low potential to a high potential.

* * * * *